US006758319B1

(12) United States Patent
Lange et al.

(10) Patent No.: US 6,758,319 B1
(45) Date of Patent: Jul. 6, 2004

(54) METHOD FOR DISCONNECTING TRANSPORT SYSTEMS AND A SECURITY CIRCUIT FOR TRANSPORT SYSTEMS

(75) Inventors: Dirk Lange, Dortmund (DE); Andreas Tautz, Waltrop (DE); Christian Maletzki, Waltrop (DE)

(73) Assignee: Kone Corporation, Helsinki (FI)

( * ) Notice: Subject to any disclaimer, the term of this patent is extended or adjusted under 35 U.S.C. 154(b) by 368 days.

(21) Appl. No.: 09/830,420

(22) PCT Filed: Aug. 12, 1999

(86) PCT No.: PCT/EP99/05927

§ 371 (c)(1),
(2), (4) Date: Jun. 5, 2001

(87) PCT Pub. No.: WO00/24664

PCT Pub. Date: May 4, 2000

(30) Foreign Application Priority Data

Oct. 26, 1998 (DE) ........................................ 198 49 238

(51) Int. Cl.[7] ................................................ B65G 43/00
(52) U.S. Cl. ........................................................ 198/323
(58) Field of Search .......................................... 198/323

(56) References Cited

U.S. PATENT DOCUMENTS 3,580,376 A * 5/1971 Loshbough ................. 198/323
4,618,932 A 10/1986 Sauer
5,083,653 A 1/1992 Sakata et al.
5,107,975 A * 4/1992 Iwata .......................... 198/323
5,186,300 A * 2/1993 Zaharia ....................... 198/323
5,526,256 A 6/1996 Sakata et al.
5,601,178 A * 2/1997 Zaharia et al. .............. 198/323
5,708,416 A * 1/1998 Zaharia et al. .............. 198/323
6,230,871 B1 * 5/2001 Balzer-Apke et al. ...... 198/323

FOREIGN PATENT DOCUMENTS

GB 2 200 002 7/1988

* cited by examiner

*Primary Examiner*—Joseph E. Valenza
(74) *Attorney, Agent, or Firm*—Venable LLP; Catherine M. Voorhees

(57) ABSTRACT

A method and a system for disconnecting passenger transport systems, especially escalators and moving walkways. Functional units of a passenger transport system monitor for malfunctions of the passenger transport systems by using switching elements and the signals of the functional units are combined to form a security chain. The signals of the functional units and signals from a drive monitoring unit are supplied to at least one pilot unit. Subsequently, a disconnecting signal is provided to a respective disconnecting contact as a result of a malfunction detected by the functional units and/or the drive monitoring system.

17 Claims, 1 Drawing Sheet

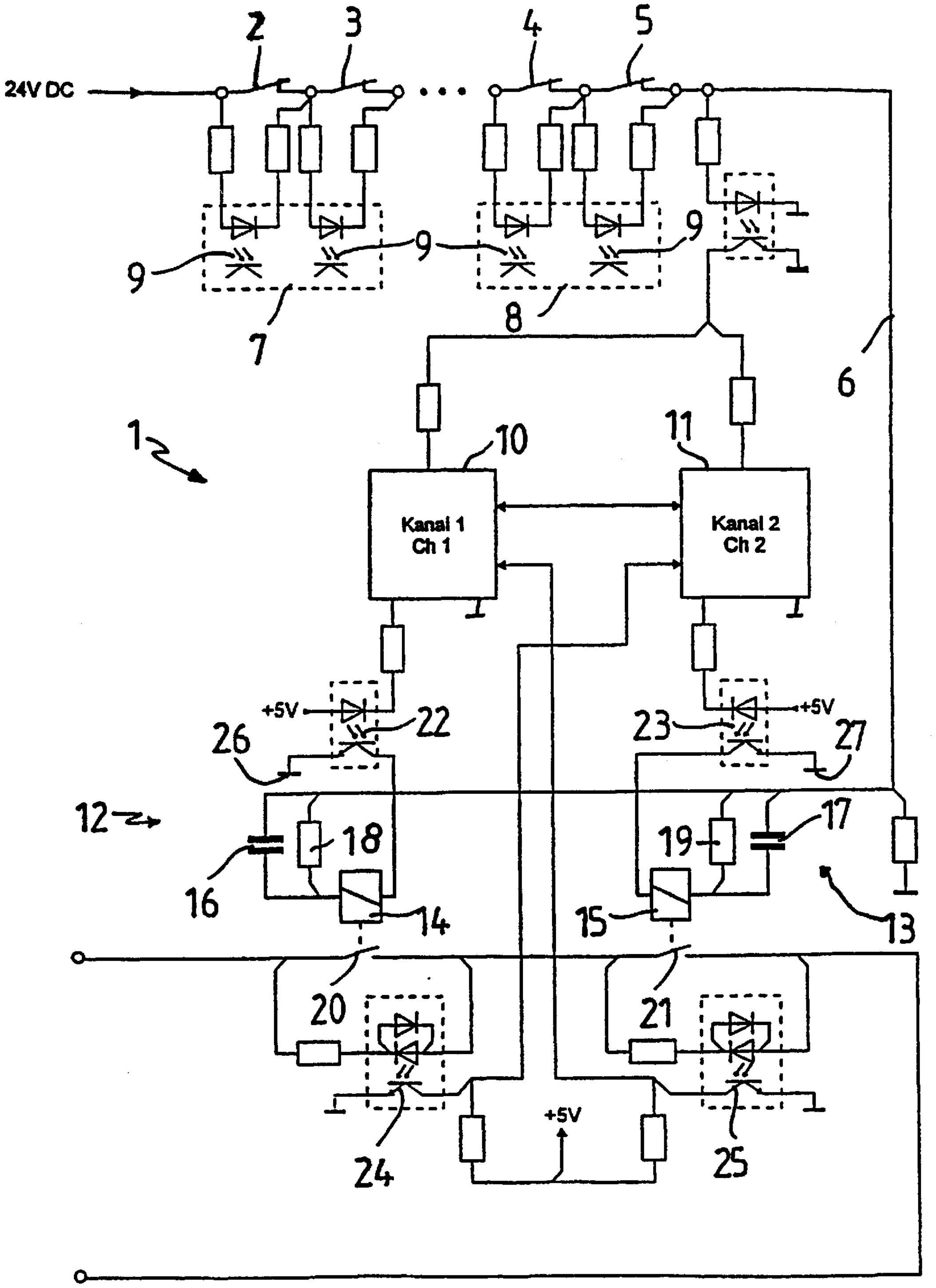
24V DC
2
3
4
5
9
9
9
9
7
8
6
1
10
11
Kanal 1
Ch 1
Kanal 2
Ch 2
+5V
22
23
+5V
26
27
12
18
19
17
16
14
15
13
20
21
24
+5V
25

METHOD FOR DISCONNECTING TRANSPORT SYSTEMS AND A SECURITY CIRCUIT FOR TRANSPORT SYSTEMS

FIELD OF THE INVENTION

The invention relates to a method for disconnecting passenger conveying systems, in particular escalators and moving walkways.

BACKGROUND OF THE INVENTION

So-called safety chains are frequently used in prior art, wherein limit switches, for example for the hand-rail intake, the step intake or the like are interconnected with respect to the signals. In the past, the elements for disconnecting the drive or drives of the individual passenger conveying systems, in particular for escalators or moving walkways, were actuated directly via this safety chain. An interruption in the safety chain therefore automatically caused the escalator or moving walkway to stop.

However, the disadvantage of this method is that other structural components, such as the error diagnosis device, cannot be optimally dimensioned because they are also tied into the safety circuit and consequently are influenced by the safety chain or its structural components with respect to function. The reason for another disadvantage is that only an individual evaluation of the added limit switches is possible. A parallel evaluation does not exist because each limit switch interrupts the voltage supply to the respectively other limit switches.

SUMMARY OF THE INVENTION

It is the object of the invention to provide a method for disconnecting passenger conveying systems as well as a safety circuit for these systems. The method allows the optimum dimensioning of the components for the error diagnosis, so that the component(s) is (are) independent of the otherwise parallel-positioned disconnecting elements at the end of the safety chain. The goal is furthermore to obtain an evaluation of several activated limit switches without resulting in mutual obstruction.

This object is achieved with a method for disconnecting passenger conveying systems, in particular escalators and moving walkways, in that the error behavior of functional units is monitored with switching elements and their signals are combined to form a safety chain. The signals from the functional units, along with the signals from the drive monitoring unit, are then supplied to at least one pilot control unit before the disconnect signal is supplied to the disconnect contact for the drive or drives, in dependence on the error behavior of the respective functional unit.

Advantageous modifications of the method according to the invention follow from the associated dependent claims.

With respect to the subject matter, this goal is also reached with a safety circuit for passenger conveying systems, in particular for escalators and moving walkways, which includes switching elements that are combined to form a safety chain in the area of functional units, at least one drive monitoring unit, at least one pilot control unit and at least one disconnect contact for the drive and the drives. For this, the signals for the safety chain and those for the drive monitoring unit can initially be supplied to the pilot control unit.

Advantageous modifications of this safety circuit follow from the associated dependent claims.

The safety chain principle according to the invention no longer leads directly to the disconnect elements for the drive or drives, but indirectly via at least one pilot control unit. This measure permits an optimum dimensioning of the structural components for the error diagnosis because they are now independent of the safety circuit.

In addition to the safety chain, the safety relays for the respective pilot control unit can also be actuated via processors in the drive-monitoring unit, wherein opto-couplers are preferably used for this.

The function of the safety relays, primarily the decay in the disconnect contacts, is respectively monitored via the aforementioned microprocessors, wherein opto-couplers are used in this case as well for reasons of circuit engineering.

The pilot control units, which preferably have a redundant layout, each comprise at least one resistor (series resistor) and at least one capacitor that is operatively connected to at least one relay coil.

According to another inventive idea, the drive monitoring unit has a redundant layout, so that two microprocessors, which preferably monitor each other, together with the signals from the safety chain, are fed to the respective pilot control units.

The signals for the safety chain and/or the drive monitoring in this case are conducted with an operating voltage of 24 V.

Each relay coil is laid out for a voltage of 12 V, even though the supply voltage for the circuit component actually is 24 V. These voltage values are necessary to ensure a secure disconnecting or switching on of the relay coil, despite the low disconnect voltage or the high pick-up voltage. The operating voltage of 24 V is distributed with the ratio of resistors (series resistors) to relay coils.

At the moment of switching it on, the relay coil requires a voltage of at least 9 V (or more with increased temperatures). The capacitor characteristic of being conducting during the switch-on moment is used for that reason. The resistors (series resistors) are thus bridged, meaning they become ineffective. During the switching on, the voltage divider ratio favors the relay coil, thereby ensuring that the pick-up voltage is reached securely.

The capacitor, which is charged up during the switching-on operation, thus no longer influences the voltage ratios during the shutdown operation (very high resistance). The influence is instead exerted by the resistance ratios for the complete safety circuit. The voltage-divider ratio is subsequently determined parallel to the limit switches by the series resistors and is adjusted such that the value falls securely below the disconnect voltage and the available output is no longer sufficient to actuate the relay coils.

The subject matter of the invention is shown in the drawing with the aid of an exemplary embodiment and is described as follows.

BRIEF DESCRIPTION OF THE DRAWINGS

The single FIGURE shows a safety circuit 1, which can be used for escalators or moving walkways (not shown).

DETAILED DESCRIPTION OF THE INVENTION

The Figure depicts limit switches 2, 3, 4, 5, used, for example, for functional units that are not shown in further detail herein, such as the handrail intake monitoring, the step intake monitoring or also the chain break monitoring. For this example, the signals are guided in series over all limit switches 2–5. The signal line 6 is operated with an operating voltage of 24 V, wherein the limit switches 2–5 are interconnected to form a so-called safety chain. The areas 7, 8 in this case serve the diagnostic function that is provided independent of the safety chain. A galvanic separation of the different low voltages present in this area is achieved via opto-couplers 9. The safety circuit furthermore comprises a motor monitoring 10, 11 with redundant layout/circuit in the form of two microprocessors, as well as an additional pilot control 12, 13 with redundant layout/circuit. Each pilot control unit 12, 13 comprises a relay coil 14, 15, a capacitor 16, 17, as well as a resistor 18, 19. The signals from the drive monitoring unit 10, 11, as well as from safety chain 2–5 are initially guided to the region of the pilot control units 12, 13 before being supplied to the disconnect contacts 20, 21 of the drive, which is not shown in this example. The arrows in this example indicate the signal guidance. The relay coils 14, 15 are laid out for a voltage of 12 V, even though the supply voltage for the switching component is actually 24 V. This voltage value is necessary to be able to securely switch the respective relay coil 14, 15 on or off despite the low disconnect voltage or the high pick-up voltage. The operating voltage of 24 V is distributed over the ratio of resistors 18, 19 to relay coils 14, 15. The safety relays 14, 15 are actuated in addition to the safety chain 2–5 by the microprocessors 10, 11. For this example, it occurs via opto-couplers 22, 23. Additional opto-couplers 24, 25 are furthermore provided, which solely function to poll the condition of the switch-off contacts 20, 21 of the drive. The microprocessors 10, 11 in this example not only monitor the respective functional units, but also monitor each other. The safety circuit 1 is closed via the reference potentials 26, 27.

The respective passenger conveying systems operate properly if the conditions "safety chain closed!" and "drive monitoring in working order" are met. In case a limit switch 2, 3, 4 or 5 responds or an error occurs in the region of the microprocessors 10, 11, which monitor each other, the signal is transferred from the respective pilot control unit 12 or 13 to the respective disconnect elements 20, 21. This action results in an immediate shutdown of the drive for the passenger conveying system.

The safety circuit 1 according to the invention thus permits a functional separation of diagnosis and disconnecting operation, wherein an optimal layout of the components required for the diagnosis is now possible because they no longer depend in any way on the other components of the safety circuit 1.

The safety circuit according to the invention furthermore permits the targeted shutdown of the pilot control or pilot controls 12 or 13 via the safety circuit I itself and/or via the microprocessors 10, 11 by the opto-couplers 22, 23.

What is claimed is:

1. A method of disconnecting passenger conveying systems comprising the steps of:

monitoring functional units of a passenger conveying system with switching elements to detect malfunctions of the passenger conveying system, wherein signals from the switching elements of the functional units are combined to form a safety chain;

supplying signals from the functional units and signals from a drive monitoring unit of at least one drive of the passenger conveying system to at least one pilot control unit;

supplying a shutdown signal, after the step of supplying signals to the at least one pilot control unit, to a shutdown contact of the at least one drive of the passenger conveying system when at least one error is detected by at least one of the functional units and the drive monitoring unit.

2. A method according to claim 1, wherein the step of supplying the shutdown signal comprises conducting the shutdown signal via a relay coil that is operatively connected to a resistor and a capacitor before the signal reaches the shutdown contact of the at least one drive motor.

3. A method according to claim 1, wherein a redundant layout or circuit is used to supply signals from the drive monitoring unit of at least one drive of the passenger conveying system.

4. A method according to claim 1, wherein the step of supplying the signals from the functional units comprises conducting the signals from the functional units to at least two pilot control units.

5. A method according to claim 1, wherein at least one of the safety chain and the drive monitoring unit has an operating voltage of 24 V.

6. A method according to claim 5, wherein the at least one pilot control unit comprises at least one resistor and at least one relay coil, where the operating voltage is divided based on a ratio of the at least one resistor and the at least one relay coil.

7. A method according to claim 1, wherein the drive monitoring unit comprises microprocessors and is actuated with opto-couplers.

8. A method according to claim 2, further comprising a step of checking a function of the relay coil by the drive monitoring unit.

9. A method according to claim 8, wherein the drive monitoring unit checks the function of the relay coil with a microprocessor.

10. A method according to claim 2, further comprising a step of monitoring the relay coil by using opto-couplers.

11. A method according to claim 10, wherein the step of monitoring the relay coils monitors a condition in the shutdown contacts.

12. A method according to claim 1, wherein the passenger conveying system comprises one of escalators and moving walkways.

13. A safety circuit for passenger conveying systems comprising:

switching elements associated with a respective functional element, the switching elements being combined to form a safety chain;

at least one drive monitoring unit to monitor at least one drive of the passenger conveying system;

at least one pilot control unit coupled to the at least one drive monitoring unit; and at least one disconnect contact for the at least one drive, the at least one disconnect contact being coupled to the pilot control unit;

wherein signals from the safety chain and signals from the at least one drive monitoring unit are initially supplied to the at least one pilot control unit.

14. A safety circuit according to claim 13, wherein both the at least one drive monitoring unit and the at least one pilot control unit comprise a redundant layout.

15. A safety circuit according to claim 13, wherein the at least one pilot control unit comprises a capacitor, a resistor and a relay coil.

16. A safety circuit according to claim 13, further comprising opto-couplers for actuating the at least one pilot control unit.

17. A safety circuit according to claim 13, wherein the passenger conveying system comprises one of escalators and moving walkways.

* * * * *